Figure 1:
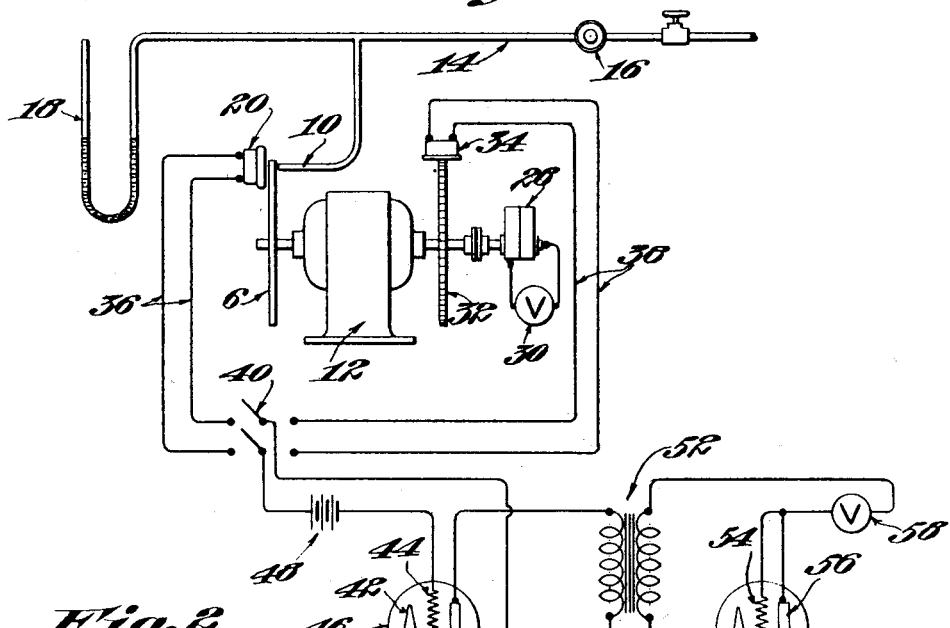

June 23, 1925.                                         1,542,994
V. DURBIN
METHOD AND APPARATUS FOR TESTING TELEPHONE RECEIVERS
Filed Jan. 10, 1923

Witness

Inventor
Vernon Durbin
by his attorneys

Patented June 23, 1925.

1,542,994

UNITED STATES PATENT OFFICE.

VERNON DURBIN, OF NEWTON, MASSACHUSETTS, ASSIGNOR TO THE HOLTZER-CABOT ELECTRIC COMPANY, OF ROXBURY, MASSACHUSETTS, A CORPORATION OF MASSACHUSETTS.

METHOD AND APPARATUS FOR TESTING TELEPHONE RECEIVERS.

Application filed January 10, 1923. Serial No. 611,893.

*To all whom it may concern:*

Be it known that I, VERNON DURBIN, a citizen of the United States, residing at Newton, in the county of Middlesex and State of Massachusetts, have invented certain new and useful Improvements in Methods and Apparatus for Testing Telephone Receivers; and I do hereby declare the following to be a full, clear, and exact description of the invention, such as will enable others skilled in the art to which it appertains to make and use the same.

The present invention relates to a method and apparatus of testing telephone receivers and is more particularly concerned with the determination of the efficiency and similar characteristics of telephone receivers.

Any direct methods of measuring the efficiency of telephone receivers by comparing the value of electrical input energy with the amount of sound energy generated are at present impracticable because there are no known means for accurately measuring sound energy. Such methods must therefore depend upon the auditory sensation received by the observer and accordingly afford merely qualitative conclusions which are of little value because of the personal equation of the observer. The difficulties in the way of quantitative measurements have been partially overcome by a certain indirect method which consists in measuring the so-called motional impedance characteristics of the receiver. This method was first proposed by Prof. Kennelley in The Electrical World of Sept. 14, 1912. Briefly this method contemplates measuring the resistance and inductance of the receiver over a range of frequencies with the receiver diaphragm successively clamped and free to vibrate. From these observations, the efficiency characteristics of the receiver may be computed. This method is more or less theoretical and since it requires a large number of tiresome measurements with an inductance bridge, it is adapted only for experimental work. The fact that it requires two men approximately two days to obtain the characteristics of one receiver over the usual range of audible frequencies severely militates against its commercial use.

The object of the present invention is to provide a method of testing telephone receivers whereby the characteristics may be determined with any desired degree of accuracy and in a shorter time than that required for previously existing methods.

With this object in view, the present invention consists in the method of testing telephone receivers hereinafter described and particularly defined in the claims.

Figure 2:
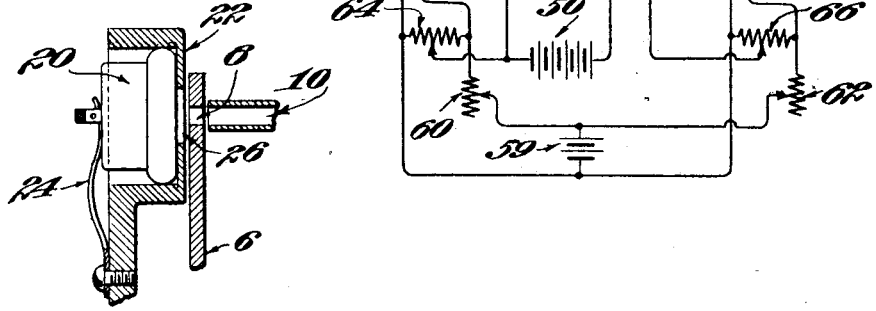
Figure 3:
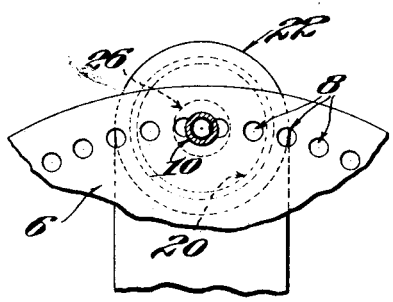
Figure 4:
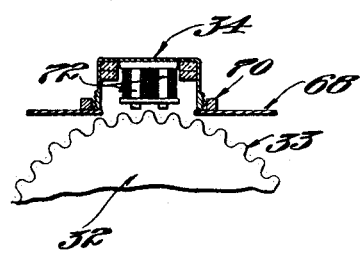

In the accompanying drawings, Figure 1 is a diagrammatic view of the apparatus for carrying out the improved method; Fig. 2 is a detail showing the means for holding the receiver in proper position with respect to the source of sound energy; Fig. 3 is a front view of the apparatus shown in Fig. 2; and Fig. 4 is a detail showing the apparatus for testing the receiver before attaching the diaphragm and cap.

According to the present invention, the receiver under test is caused to act as a generator of electrical currents due to the motion of the receiver diaphragm upon which is externally impressed an amount of sound energy from a suitable source. The amount of sound energy thus impressed upon the sound diaphragm is not necessarily determinate, but the circumstances under which the sound is generated should be maintained practically constant throughout the testing operation, a condition which may be easily fulfilled in practice. The electrical output of the receiver may be measured by any of the well-known means and from these observations the efficiency, resonance characteristics and other desired data may be computed. As an incident to the commercial testing of receivers, the invention also provides a simple and accurate method for testing the properties of the receiver before the diaphragm and cap are assembled thereon. This operation preferably consists in moving a toothed disk of magnetic material at a short distance from the windings of the receiver to generate therein an electrical voltage which may be compared with that generated in a standard receiver under similar conditions. By this means, any receivers which have defective windings or improperly spaced cores or imperfect magnets may be immediately detected before going through the test of the completed receiver.

The illustrated embodiment of the invention utilizes as its source of sound energy a siren consisting of a rotating disk 6 provided with a plurality of holes 8 near its periphery against which a blast of air is directed through a tube 10. The holes 8 are preferably circular, and adjacent holes are spaced apart distances approximately equal to their diameters in order that the emitted note may not greatly vary from a sine wave. Although the number of holes in the disk is immaterial within reasonable limits, it is preferred to employ a disk having sixty equally spaced holes. The disk is rotated by a motor 12 which is preferably of the direct current type having a rheostat of the usual type in the armature or field circuit by which the operator may conveniently vary the speed. The tube or pipe 10 connects with a second pipe 14 which leads from any convenient air supply through a reducing valve 16 by which the pressure of the air which is blown against the disk 6 may be regulated. The pressure is measured by a mercury manometer 18 or other suitable pressure measuring device. The receiver 20 which is under test is illustrated as one of a pair usually employed in radio head-sets, but the present method may obviously be extended to include the testing of receivers of any other type. As indicated in Fig. 2, the receiver is maintained a fixed distance from the source of sound energy by a clamp member having a face 22 against which the cap of the receiver is pressed by a spring 24. The face 22 is provided with an opening 26 to admit the sound generated by the siren to the diaphragm of the receiver. It will be seen that when the motor is running the siren will generate a note whose frequency is proportional to the motor speed, the sound energy thus generated being impressed upon the receiver diaphragm in a manner to oscillate the latter and generate a voltage in the windings of the receiver. In order to determine the frequency of the note, the speed of the motor may be determined by any of the usual forms of tachometers, indicated in Fig. 1 as a magneto 28 coupled to the motor shaft and electrically connected to a voltmeter 30. The voltmeter deflection is proportional to the motor speed, and, if desired, the voltmeter may be calibrated to indicate directly the frequency of the source of sound energy. Mounted upon the motor shaft is a second disk 32 for the purpose of testing the magnetic characteristics of a second receiver 34 in a manner which will be presently explained.

The electrical voltages generated by the receivers under test may be measured by any suitable alternating current measuring apparatus but since the generated voltages are rather small, it is desirable to first amplify and rectify them, thereafter taking the actual readings with a direct current instrument. To this end, receiver 20 connects by lead wires 36 and receiver 34 by lead wires 38 to a double-pole double-throw switch 40, the blades of which are connected to the filament 42 and grid 44 of a three-electrode vacuum tube 46. The grid circuit preferably includes a negative grid battery 48 to allow undistorted amplification of the oscillations. The plate circuit of the tube includes a battery 50 and the primary of the transformer 52, the secondary of which is connected to a rectifying device. This rectifying device may conveniently comprise a two-electrode valve but in Fig. 1 it is shown as a three-electrode valve of the usual type having its grid 54 and plate 56 electrically connected together. The rectified oscillations are measured with a direct current measuring instrument indicated at 58 as a voltmeter. The filaments of the tubes are energized by the battery 59 through adjustable rheostats 60 and 62. The grid and plate circuits of the tubes preferably connect with the filament circuit through potentiometers 64 and 66.

The apparatus described in the foregoing, consisting of the siren wheel 6 and the cooperating air supply, is for the purpose of testing the finished receivers. As previously stated, however, it is desirable to test the receivers before the diaphragms and caps are mounted thereon. To this end, the receiver 34 without diaphragm or cap is mounted as shown in Fig. 4, upon a plate 68 having a retaining ring 70 within which the receiver snugly fits. The plate 68 is provided with a circular opening above which the magnets 72 of the receiver are suspended and into which the periphery of the rotating disk 32 slightly extends. The disk is constructed of magnetic material, preferably soft iron, and, as indicated in Fig. 4, is provided with a series of teeth 33, the distance between adjacent teeth being substantially equal to the distance between the core centers of the receiver magnets. As in the case of the siren disk, the disk 32 is preferably provided with sixty teeth. The rotation of the toothed disk beneath the receiver 34 causes a changing magnetic flux to pass through the magnets of the receiver, thereby generating in the windings an electrical voltage which may be amplified, rectified, and thereafter measured by instrument 58, as in the case of receiver 20. This construction therefore affords a convenient means for determining whether the magnets and windings are up to standard and if the air gap of the receiver is of the proper value to secure the desired results. The use of a toothed disk 32 and a cooperating receiver 34 also serves another important purpose, namely, the calibration of the measuring instruments. It will be apparent that the conditions existing in the vacuum tubes and other parts of the measuring circuit should not be allowed to change appreciably during the test, otherwise faulty readings will be given by the instrument 58. The conditions may be kept substantially constant by carefully adjusting the filament voltages, the potentiometers 64 and 66, and the other variable parts of the circuits to the proper values. The most convenient way of carrying this out is to place a standard receiver in the position of receiver 34 and rotate the disk 32 at a predetermined velocity, during which the instrument 58 should come to a known reading. If such is not the case, the various rheostats in the tube circuits may be adjusted until the proper reading is secured. This standard receiver may be received in the ring 70 in place of the receiver to be tested.

In commercial testing, after the measuring circuits have been properly adjusted, the receiver without diaphragm or cap is placed in the position 34 and the toothed disk 32 is rotated at a predetermined speed, preferably at such speed as to generate a voltage of 500 cycles in the winding. This voltage is measured by the instrument 58 and should lie within certain limits, as previously determined by a standard receiver. If the receiver passes this test successfully, the diaphragm and cap are then assembled thereon and the completed receiver is clamped in the position illustrated in Fig. 2. For a quick test, the motor is speeded up to the miximum desired speed (preferably that corresponding to a note of between 4,000 and 5,000 cycles) and then allowed to gradually slow down, the indications of the instruments 30 and 58 being simultaneously taken at a number of different speeds. This method is very fast, the entire test for each receiver usually averaging about one-half minute. When results of greater accuracy are desired, it is preferable to allow the motor to come to a constant speed before taking each reading but this method takes a slightly longer time. In any event, the air pressure, as indicated by the manometer reading, should be maintained as nearly constant as possible throughout the test.

The readings obtained by the above method form the data from which the usual receiver characteristic curves may be drawn. In particular, if the reading of instrument 30 or the square of the reading be plotted against the frequency of the source of sound energy, a resonance curve of the usual form will be obtained showing a high peak at between 800 and 1,000 cycles and a sudden falling off at each side of the peak. These results have been found to accord with those obtained by the more laborious motional impedance method and this fact establishes a means of comparison of the results of the two methods. Since in the present method the source of sound energy is not determinate, the various results are only relative but by comparing the data obtained upon one receiver by both methods, a calibration for the present method in terms of the motional impedance method may be secured, if desired. The accuracy of the results depends only upon the accuracy of the instruments and the degree of care used in taking the readings. In commercial testing, a high degree of precision is not required and the testing operations may be very quickly effected, thereby enabling the manufacturer to actually test every receiver as made in the quickest possible manner instead of merely testing a small number of representative receivers from the entire lot. However, it is understood that the method is adapted not only for commercial work but may be employed for the experimental determination of receiver characteristics even where a high degree of accuracy is required.

Having thus described the invention, what is claimed is:

1. The method of testing telephone receivers which consists in impressing a fixed amount of sound energy at different definite frequencies upon the diaphragm of the receiver and measuring the electrical output of the receiver at each frequency.

2. The method of testing a telephone receiver which consists in impressing musical notes of different frequencies and the same amount of sound energy upon the receiver diaphragm and measuring the electrical output of the receiver at each frequency.

3. The method of determining the characteristics of a telephone receiver which consists in directing a current of air at constant pressure against a perforated rotating disk at varying speed, impressing the sound energy thus generated upon the diaphragm of the receiver at a fixed distance from the disk and measuring the voltages generated in the windings of the receiver.

4. The method of testing the magnetic characteristics of a telephone receiver without a diaphragm or cap which consists in causing a regular and periodical variation in magnetic flux through the windings of the receiver, and measuring the voltage generated in the windings.

5. The method of testing the magnetic characteristics of a telephone receiver without diaphragm or cap which consists in rotating a toothed disk of magnetic material with its periphery a fixed distance from the windings of the receiver and measuring the voltage generated in the windings.

6. The method of testing a telephone receiver which consists in directing a current of air at constant pressure against a rotating perforated disk and impressing the sound energy thus generated upon the diaphragm of the receiver at a fixed distance from the disk, and measuring the voltage generated in the windings of the receiver.

7. The method of determining the characteristics of a telephone receiver which consists in impressing a musical note of gradually changing frequency and of constant sound energy upon the receiver, and taking a series of simultaneous measurements of the frequency and the electrical output of the receiver.

8. The method of determining the characteristics of a telephone receiver which consists in directing a current of air at constant pressure against a rotating perforated disk, gradually changing the speed of the disk, and taking a series of simultaneous measurements of the speed of the disk and the electrical output of the receiver.

9. An apparatus for testing telephone receivers having, in combination, a rotatable toothed disk of magnetic material, means for maintaining the windings of a telephone receiver in fixed position with respect to the disk in order to generate an electrical voltage in the windings, and means for measuring the electrical output of the receiver windings.

10. An apparatus for testing telephone receivers having, in combination, a toothed disk of magnetic material, a plate and a retaining ring for maintaining a receiver, without diaphragm or cap, in fixed position with respect to the disk, means for rotating the disk to generate an electrical voltage in the receiver windings, and means for measuring the electrical output of the receiver.

11. An apparatus for testing telephone receivers having, in combination, a motor, a toothed disk of magnetic material rotated by the motor, a plate and a retaining ring upon the plate for holding the windings of a telephone receiver in fixed position with respect to the disk, a siren disk rotated by the motor, a bracket for holding the receiver when completed at a fixed distance from the siren disk, means for directing a blast of air against the disk to generate a musical note, and means for measuring the electrical output of the receiver in each position.

12. An apparatus for testing telephone receivers having, in combination, a rotatable shaft, a toothed disk of magnetic material mounted upon the shaft, means for positioning the windings of a receiver with relation to the toothed disk for generating an electrical voltage in the windings, means mounted upon the shaft for generating sound energy, means for holding the completed receiver at a fixed distance from the source of sound energy to generate a voltage in the receiver, and electrical apparatus for measuring the electrical output of the receiver during each test.

13. An apparatus for testing telephone receivers having, in combination, a rotatable shaft, a toothed disk of magnetic material and a siren disk mounted upon the shaft, means for positioning the windings of a receiver in fixed relation to the toothed disk to generate an electrical voltage in the windings, means for positioning the completed receiver at a fixed distance from the siren disk, means for blowing a current of air against the siren disk to generate a musical note, and means for measuring the electrical output of the receiver during each test.

VERNON DURBIN.